US012562526B2

(12) United States Patent
Eckel

(10) Patent No.: US 12,562,526 B2
(45) Date of Patent: Feb. 24, 2026

(54) CONTACT PIN WITH A COOLING CHANNEL SYSTEM AND ELECTRICAL PLUG WITH SUCH A CONTACT PIN

(71) Applicant: TE Connectivity Germany GmbH, Bensheim (DE)

(72) Inventor: Markus Eckel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 1009 days.

(21) Appl. No.: 17/692,694

(22) Filed: Mar. 11, 2022

(65) Prior Publication Data

US 2022/0200196 A1 Jun. 23, 2022

Related U.S. Application Data

(63) Continuation of application No. PCT/EP2020/075511, filed on Sep. 11, 2020.

(30) Foreign Application Priority Data

Sep. 13, 2019 (DE) ..................... 10 2019 214 024.6

(51) Int. Cl.
*H01R 13/533* (2006.01)
*H01R 13/24* (2006.01)
*H01R 101/00* (2006.01)

(52) U.S. Cl.
CPC ....... *H01R 13/533* (2013.01); *H01R 13/2471* (2013.01); *H01R 2101/00* (2013.01); *H01R 2201/26* (2013.01)

(58) Field of Classification Search
CPC .............. H01R 13/533; H01R 13/2471; H01R 2101/00; H01R 2201/26; H01R 2103/00;
(Continued)

(56) References Cited

U.S. PATENT DOCUMENTS 11,469,531 B2 * 10/2022 Cole .................... H01R 13/005
2009/0239408 A1 9/2009 Sacher et al.
(Continued)

FOREIGN PATENT DOCUMENTS

CN 207572574 U 7/2018
CN 110148495 A 8/2019
(Continued)

OTHER PUBLICATIONS

PCT International Search Report and Written Opinion, Application No. PCT/EP2020/075511, Dated: Mar. 15, 2022, 8 pages.
(Continued)

*Primary Examiner* — Briggitte R. Hammond
(74) *Attorney, Agent, or Firm* — Barley Snyder

(57) ABSTRACT

A contact pin for an electrical plug includes a contact element formed of an electrically conductive material and a contact protection formed of an electrically non-conductive material and at least partially enclosing the contact element. A cooling channel system conducting a cooling fluid is formed in the contact protection. The cooling channel system has a cooling fluid supply and a cooling fluid return connected to the cooling fluid supply in a fluid conducting manner. The fluid cooling channel extends to a distal end of the contact element that faces a mating plug matable with the electrical plug.

16 Claims, 10 Drawing Sheets

(58) Field of Classification Search
CPC ........ H01R 13/04; H01R 13/44; H01R 24/66; H01R 13/005; H01R 13/02; H01R 13/40; H01R 13/46; B60L 53/302; B60L 53/16; H05K 7/20272
See application file for complete search history.

(56) References Cited

U.S. PATENT DOCUMENTS

| | | | |
|---|---|---|---|
| 2016/0064849 | A1 | 3/2016 | Eckel |
| 2019/0036254 | A1 | 1/2019 | Moseke |

FOREIGN PATENT DOCUMENTS

| | | | |
|---|---|---|---|
| DE | 202019102461 | U1 | 5/2019 |
| DE | 20 2019 102 461 | U1 | 6/2019 |
| EP | 3379655 | A1 | 9/2018 |
| WO | 2009134379 | A1 | 11/2009 |
| WO | 2012051510 | A2 | 4/2012 |
| WO | 2017133893 | A1 | 8/2017 |
| WO | 2021048380 | A1 | 3/2021 |

OTHER PUBLICATIONS

PCT Notification, The International Search Report and The Written Opinion, Intl App No. PCT/EP2020/075511, dated Nov. 17, 2020, 14 pages.

* cited by examiner

CONTACT PIN WITH A COOLING CHANNEL SYSTEM AND ELECTRICAL PLUG WITH SUCH A CONTACT PIN

CROSS-REFERENCE TO RELATED APPLICATIONS

This application is a continuation of PCT International Application No. PCT/EP2020/075511, filed on Sep. 11, 2020, which claims priority under 35 U.S.C. § 119 to German Patent Application No. 102019214024.6, filed on Sep. 13, 2019.

FIELD OF THE INVENTION

The present invention relates to electrical plugs and, more particularly, to contact pins of electrical plugs.

BACKGROUND

In automotive technology, transmission of electrical current through detachable plug connections is necessary for a plurality of applications. For example, motor vehicles with an electric drive and built-in accumulator are connected to an electric charging column for the duration of the charging process. In order to reduce the charging time, high electric currents and/or voltages are used in the charging system. In particular, the electrical security and the current carrying capacity of the current carrying components of the charging system represent limiting factors.

The electrical security is to be ensured in accordance with the applicable provisions, such as of statutory, legal, contractual, normative and/or technical kind. The current carrying capacity is, among others, dependent on the choice of materials of the current carrying components and on the surrounding conditions of the charging system. Furthermore, the current carrying capacity in common charging systems decreases with increasing operating time. A low current carrying capacity results in longer charging times and may, in some circumstances, also lead to restricted functionality of the plug connections and the entire charging system, respectively.

SUMMARY

A contact pin for an electrical plug includes a contact element formed of an electrically conductive material and a contact protection formed of an electrically non-conductive material and at least partially enclosing the contact element. A cooling channel system conducting a cooling fluid is formed in the contact protection. The cooling channel system has a cooling fluid supply and a cooling fluid return connected to the cooling fluid supply in a fluid conducting manner. The fluid cooling channel extends to a distal end of the contact element that faces a mating plug matable with the electrical plug.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
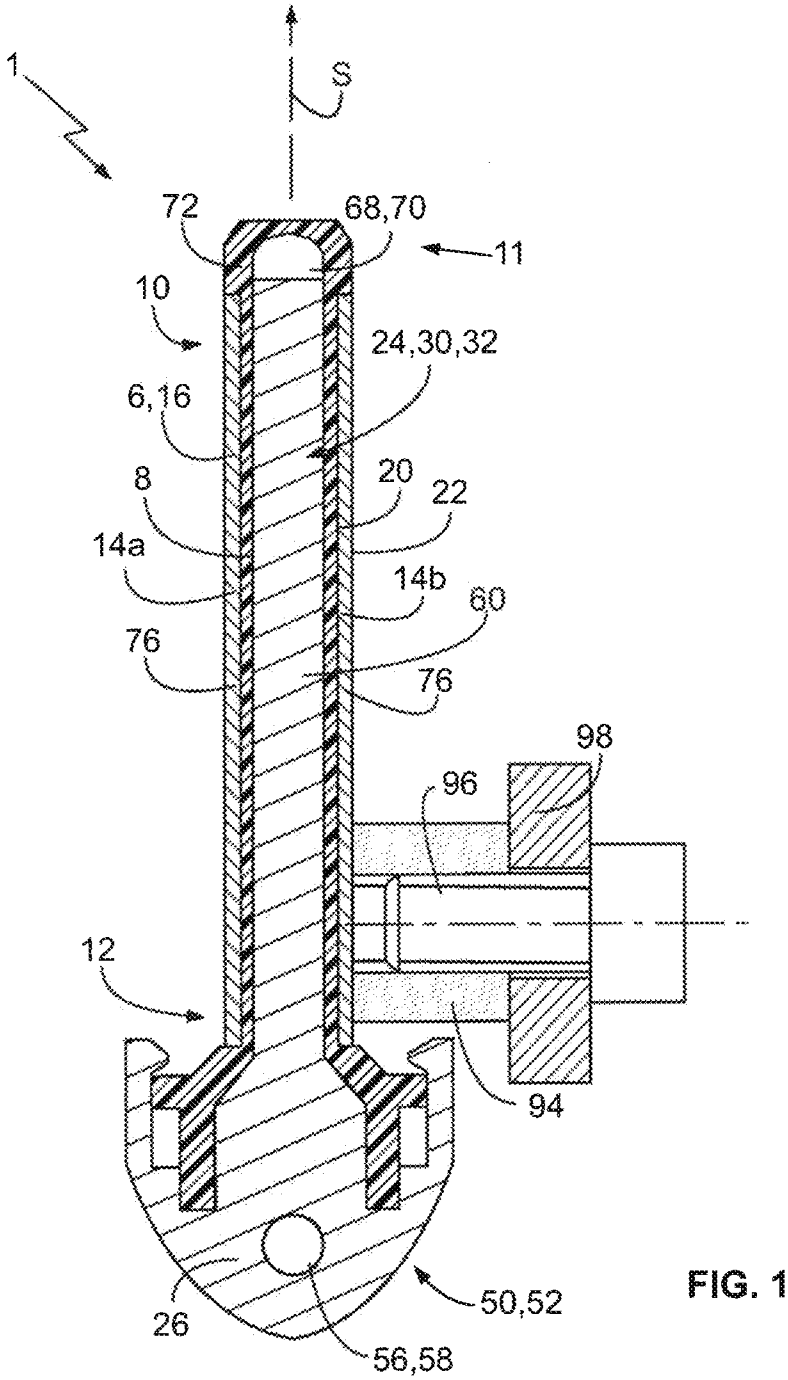
FIG. 1 is a sectional view of a contact pin according to an embodiment.

Hereinafter, with reference to the attached drawings, the invention is explained in greater detail using multiple exemplary embodiments, whose different features can be combined arbitrarily.

First, the schematic structure of the inventive contact pin 1 is depicted with reference to FIGS. 1 to 4, 8 and 9. Subsequently, the schematic structure of an inventive electrical plug is described with reference to FIGS. 5 to 7 and 10.

The inventive contact pin 1 for an electrical plug 2, the electrical plug 2 being matable in a plugging direction S with a mating plug, may comprise, in a possible embodiment, an electrically conducting contact element 6 and an electrically non-conducting contact protection 8. The electrical plug 2 may be a high-voltage plug, for example for us in automotive technology, having exemplary voltages in a range of 1000 V to 1500 V.

The contact element 6 may have a longitudinal shape and extend along the plugging direction S. The contact element 6 may have a distal end 10 and a proximal end 12. The distal end 10 may in the plugging direction S face towards the mating plug. The proximal end 12 may be located opposite the distal end 10 and face away from the mating plug.

Further, the contact element 6 may comprise two opposing sections 14*a*, 14*b*. In FIGS. 1 to 4, the contact element 6 is depicted as a hollow profile 16 with a rectangular cross section and a hollow chamber 18. The contact element 6 may generally be formed of any electrically conducting material, such as copper, aluminum, silver, gold, platinum or other metals, and alternatively comprise a U-shaped, semicircle-shaped, part circle-shaped, round or square cross section. The shaping of the hollow profile 16 may also vary along the plugging direction S with continuous and/or stepwise transitions. The contact element 6 may be configured to be an extruded profile, a stamped and bent part or as a deep drawn part having the hollow chamber 18. Thus, in this embodiment, mechanical characteristics of the metallic material may be exploited, in order to strengthen the mechanical stability of the cooling channel system.

The contact protection 8 may sectionally surround the contact element 6 and abut at least one inner surface 20 and/or outer surface 22 of the contact element 6. In an embodiment, the contact protection 8 abuts multiple inner surfaces 20 and/or outer surfaces 22 of the contact element 6, such that the contact element 6 is completely restricted in all degrees of freedom of its movement possibilities. Notably, the contact element 6 is carried or held by the contact protection 8. For this, the contact protection 8 may, by way of example, be a plastic molded onto the contact element 6 by an in-mold-process. With this embodiment, the contact element 6 is fixed via the contact protection 8, so that a loss of the contact element 6 by moving and slipping of the contact element 6 during plugging together with the mating plug is prevented.

Figure 2:
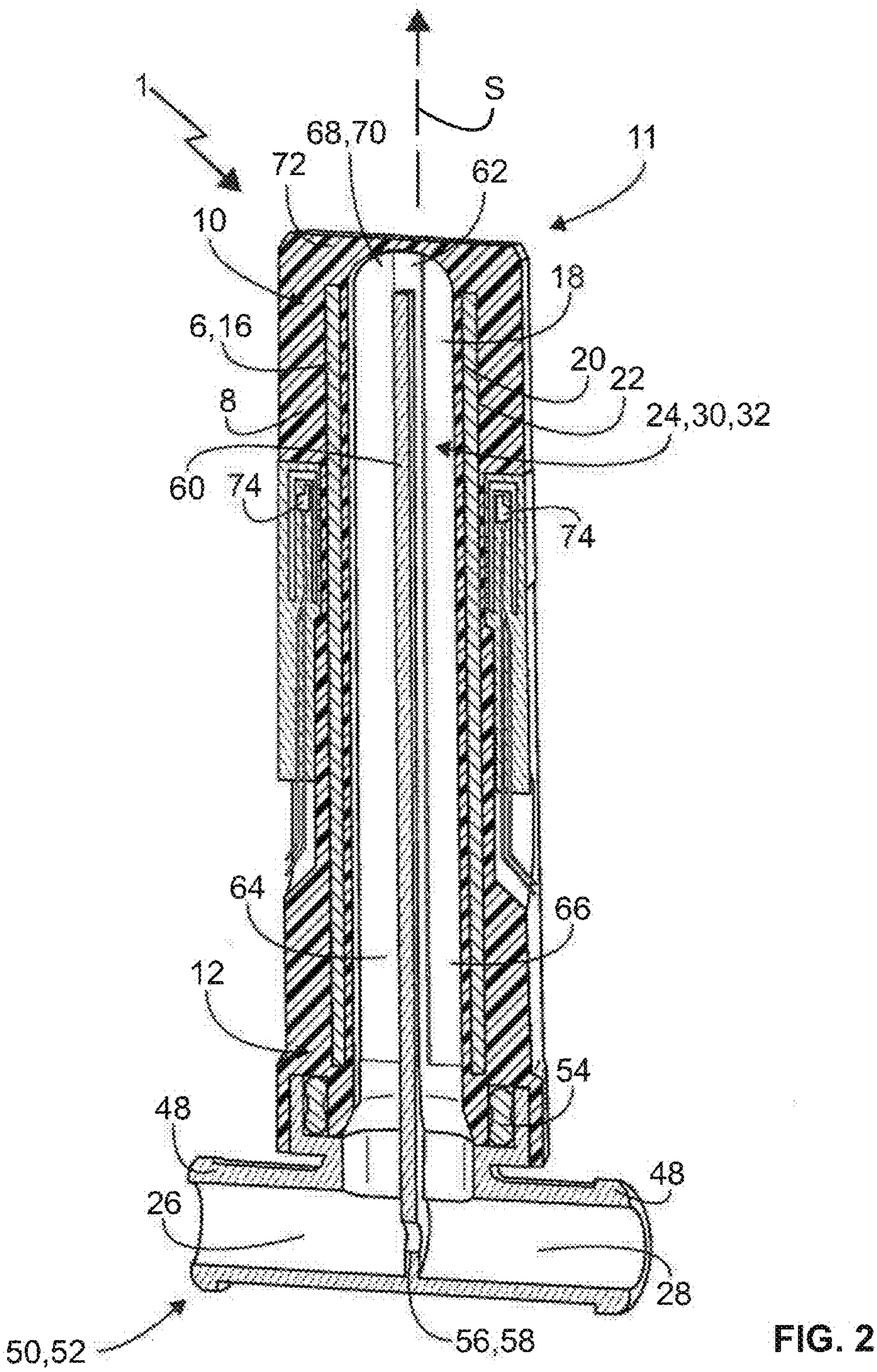
FIG. 2 is a sectional perspective view of the contact pin.
Figure 3:
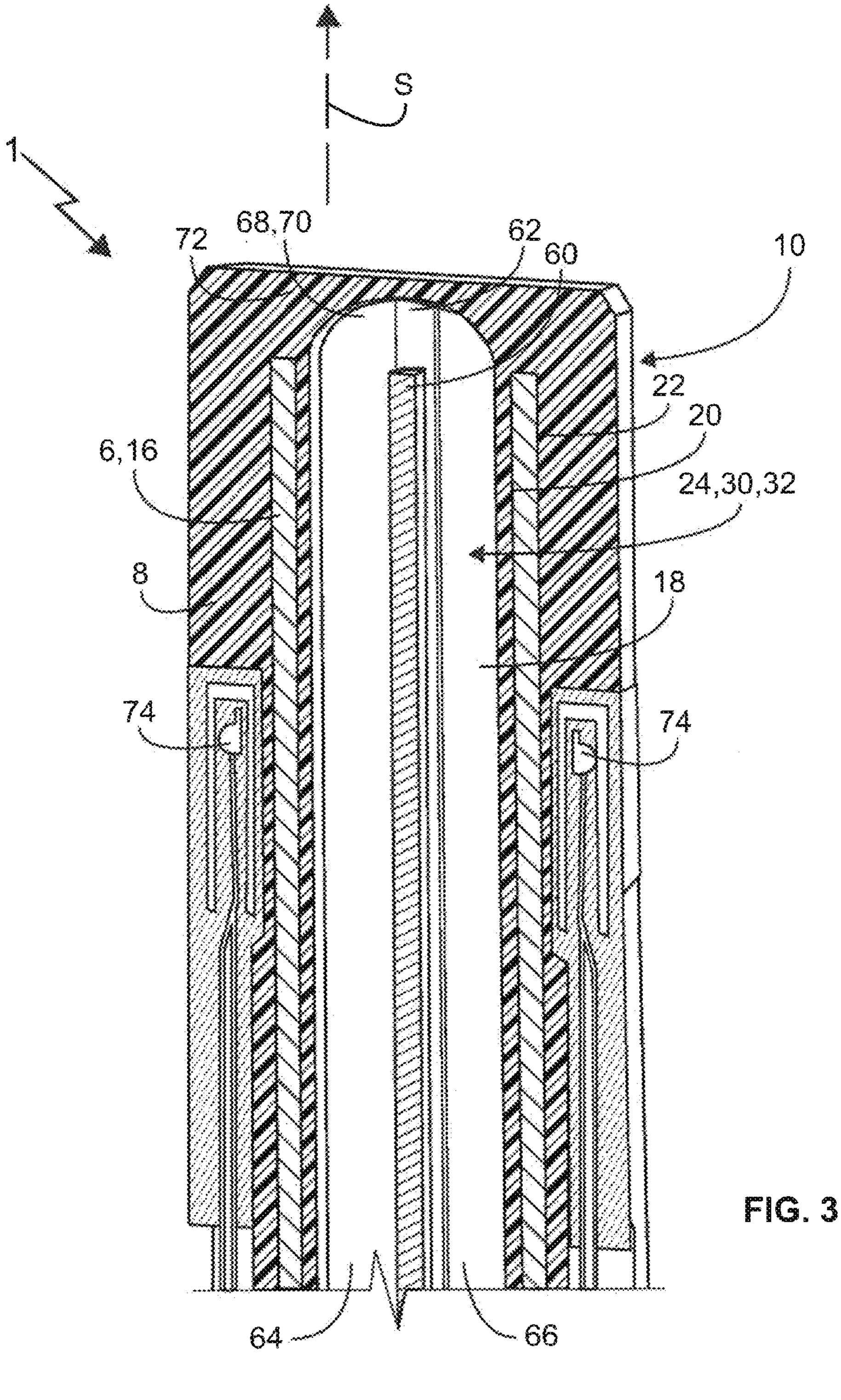
FIG. 3 is an enlarged view of a portion of FIG. 2.
Figure 4:
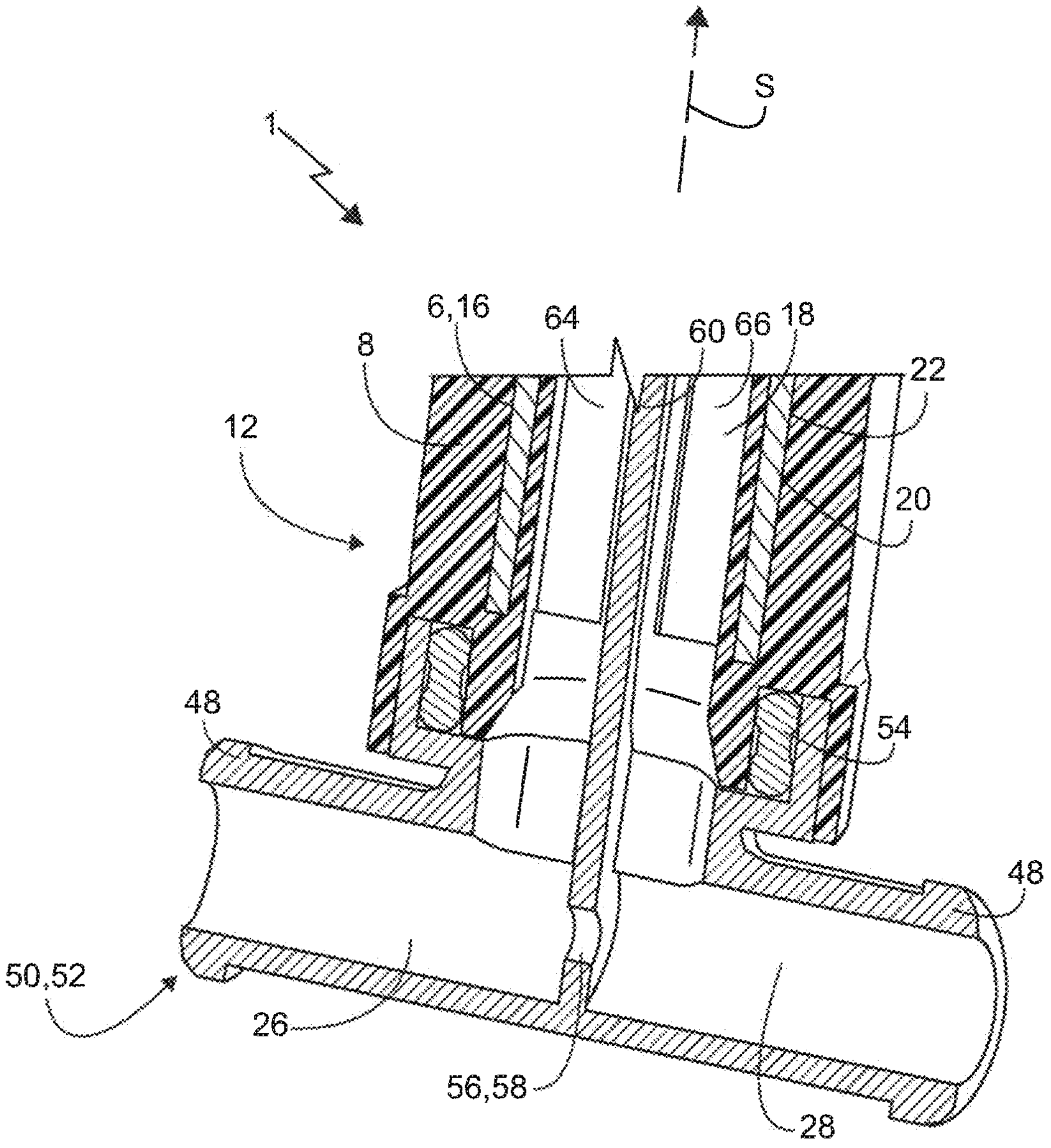
FIG. 4 is an enlarged view of another portion of FIG. 2.

Additionally, in the contact protection 8, at least one cooling channel system 24 for conducting a cooling fluid may be formed, as shown in FIGS. 1 to 3. The cooling channel system 24 comprises a cooling fluid supply 26 and a cooling fluid return 28. The cooling fluid supply 26 may be connected to the cooling fluid return 28 in a fluid conducting manner via a straight cooling channel 30. The cooling channel 30 may be formed in the contact protection 8 along the plugging direction S as a recess, cavity and hollow space 32, respectively.

In the shown embodiments of FIGS. 1 to 4, the entire cooling channel system 24 is formed by the contact protection 8, so that the contact element 6 may at no point be wetted directly from the cooling fluid. In an alternative embodiment, not shown, the contact element 6 may at least partially form a wall of the cooling channel system 24, for example via corresponding slots, openings and/or recesses in the contact protection 8 or via partial or complete omission of the contact protection 8 within the hollow chamber 18 of the contact element 6. In this case, a sufficient liquid tightness or imperviousness of the cooling channel system 24 is to be ensured, for example via overmoulding or adhering of the contact element 6 with the contact protection 8. Hence, the contact element 6 may be wetted, at least in sections, by the cooling fluid. A direct wetting of the contact element 6 enables an immediate heat transfer from the contact element 6 into the cooling fluid. As a result, the cooling effect of the active cooling is further improved.

In an embodiment, the cooling channel system 24 in this embodiment may be designed for the use of an electrically non-conducting cooling fluid, such as a non-conducting liquid, a dielectric liquid and/or a non-conducting gas. This is insofar advantageous, as unwanted corrosion phenomena on the contact element 6, which would be caused by creeping currents in electrically conducting fluids, may be prevented.

In an alternative embodiment, the cooling channel system 24 may solely be formed by the contact protection 8 and may be designed for the use of an electrically conducting liquid, such as a water glycol mixture. The contact element 6 will not be directly wetted at any place in this alternative embodiment. This increases the range of deployable cooling fluids, as it allows the application of cooling fluids, which, due to their electric conductivity and/or corrosion promoting effect, may not come into direct contact with the contact element 6. Hence, by way of example, cooling fluids with high specific heat capacities may be used without restriction. In addition, cooling fluids may be used, which generally exhibit a high availability and/or environmental compatibility. The result is a cost and effort reduction for the acquisition, transport, storage and/or disposal of the respective cooling fluid.

Figure 8:
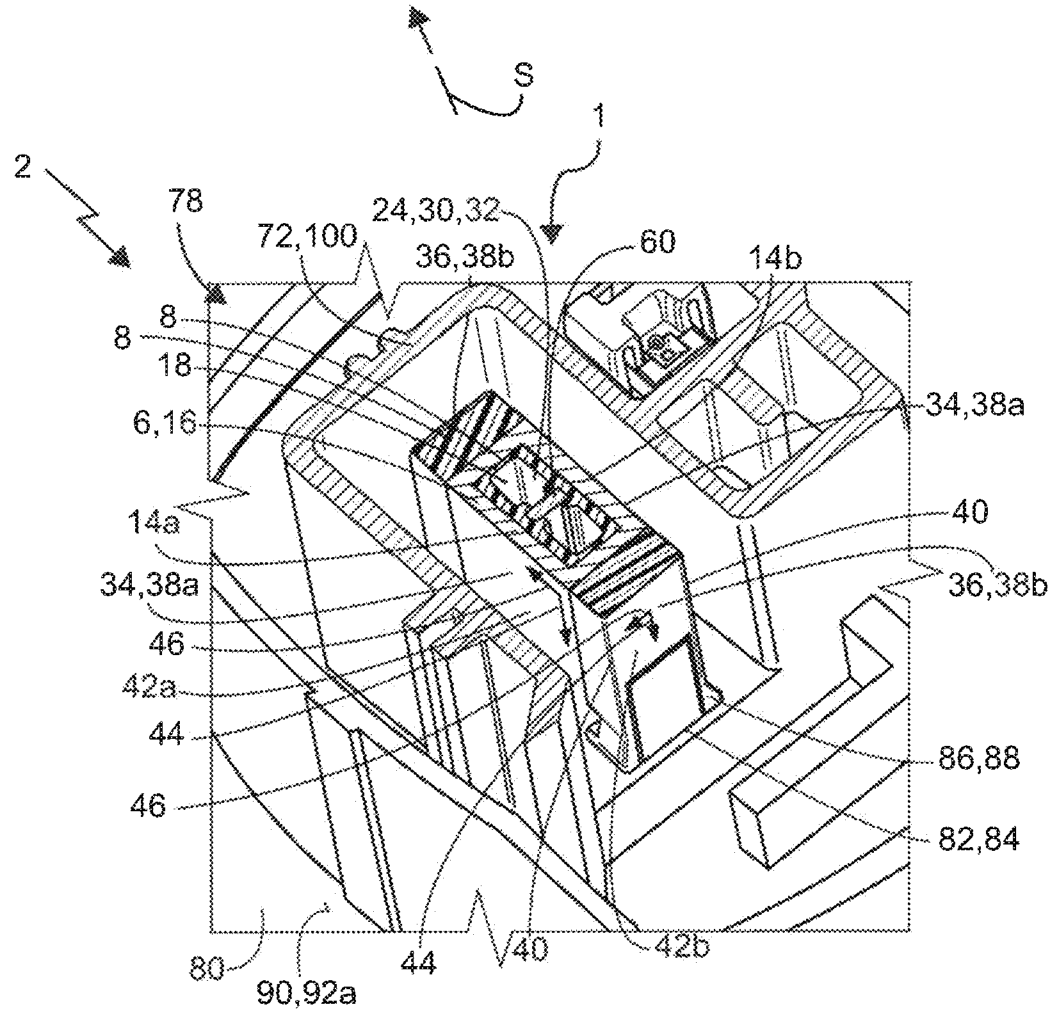
FIG. 8 is a sectional perspective detail view of the electrical plug.
Figure 9:
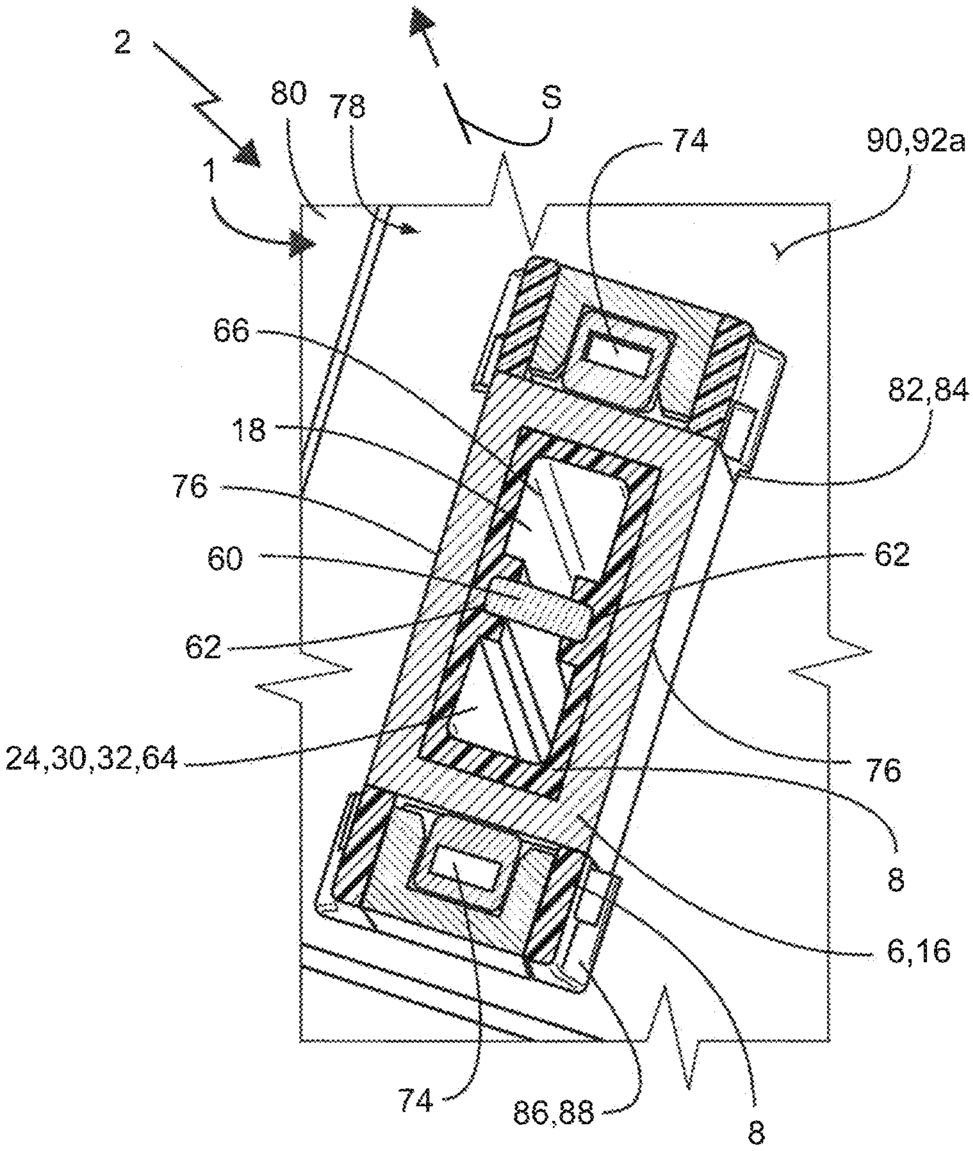
FIG. 9 is an enlarged sectional perspective view of the electrical plug.

As depicted in FIGS. 8 and 9, the cooling channel 30 may comprise a cross section perpendicular to the plugging direction S, which, in an embodiment, is geometrically similar to the cross section of the contact element 6. For example, in case of a rectangular profile of the contact element 6, the cooling channel 30 correspondingly comprises a rectangular cross section. The contact protection 8 and the contact element 6 may in this case be arranged in such a manner that in at least one cross section perpendicular to the plugging direction S of the contact pin 1 two opposing flat sides 34 of the contact pin 1 are formed by the contact element 6 and two other opposing sides 36 of the contact pin 1 are formed by the contact protection 8. Adjacent sides 38*a*, 38*b* of the contact pin 1 may each be joined to one another via edges 40. Particularly, the adjacent sides 38*a*, 38*b* may in this case comprise surfaces 42*a*, 42*b*, which are oriented perpendicular to one another. This means that at least one first surface spanning vector 44 of the respective surface 42*a*, 42*b* runs parallel to the plugging direction S, while a second surface spanning vector 46 runs perpendicular to the plugging direction S. In this embodiment, the contact element 6 comprises at least two exposed contact surfaces, which in regard to their orientation do not hinder insertion of the electrical plug 2 into the mating plug along the plugging direction S.

At the proximal end 12 of the contact element 6, ports 48 for each of the cooling fluid supply 26 and the cooling fluid return 28 may be located, as shown in FIG. 2. In an embodiment, at least one cooling fluid supply line may be connected to the cooling fluid supply 26 and at least one cooling fluid return line to the cooling fluid return 28. The cooling fluid supply line transports cooling fluid towards the cooling channel system 24 and the cooling fluid return line transports the cooling fluid away from the cooling channel system 24. For this, the contact pin 1 may particularly comprise a T-piece 50. The T-piece 50 is arranged at the proximal end 12 of the contact element 6 and forms the corresponding ports 48. The T-piece 50 may, in the form of a separate component 52, be put over the contact pin 1 via the contact protection 8 and rest on a sealing ring 54. The T-piece 50 may alternatively be in the form of an integral component of the contact protection 8.

By a round opening 56, an internal bypass 58 may be formed in the T-piece 50, as shown in FIG. 2. The round opening 56 may connect the cooling fluid supply 26 with the cooling fluid return 28, so that a predefined portion of the cooling fluid may flow passed the cooling channel system 24, without flowing through the cooling channel system 24. The splitting ratio at the bypass 58 may be defined by the non-varying geometry of the opening 56 or be adjustable by a valve and flap, respectively. The bypass 58 allows it to adjust the flow rate in the cooling channel system 24 for each application or each operating mode. Moreover, the bypass 58 allows an effective use of a common cooling fluid line for multiple cooling channel systems 24 of multiple contact pins arranged in series, in that the bypass 58 divides the total flow rate and thus prevents that each cooling channel system 24 has to be flowed through. Thus, this leads to savings in operating expenses, as a lower pressure drop results.

Moreover, as shown in FIGS. 1 to 4, a partition wall 60 may run through the cooling channel system 24. The partition wall 60 may be formed as part of the T-piece 50, protrude from the proximal end 12 of the contact element 6 in the plugging direction S into the cooling channel system 24, be held by longitudinal slots 62 of the contact protection 8 and divide the straight cooling channel 30 into a first channel section 64 and a second channel section 66. The first channel section 64 may be connected in a fluid conducting manner via a curved channel section 68 with the second channel section 66. In an embodiment, the first channel section 64, the curved channel section 68 and the second channel section 66 may result in a U-shaped pathway of the cooling channel system 24. This means the first channel section 64 may be connected to the port 48 of the cooling fluid supply 26 and extend in the plugging direction S. The curved channel section 68 may form a change in direction. The second channel section 66 may be formed parallel to the first channel section 64 and lead to the port 48 of the cooling fluid return 28. In an alternative embodiment, the T-piece 50 and/or the partition wall 60 may be manufactured as integral components of the contact protection 8 by 3D-printing or other generative manufacturing processes. The use of a partition wall 60 enables providing the cooling channel system with a U-shaped pathway, without using components with undercuts.

As is shown in FIGS. 1 and 2, the cooling channel system 24 may extend along the plugging direction S at least over the entire length of the contact element 6. In an embodiment, at least one part 70 of the cooling channel system 24 may be located in the contact protection 8 beyond the distal end 10 of the contact element 6. For this, in an embodiment, a free end 11 of the contact protection 8 may overtop the distal end 10 of the contact element 6 in plugging direction S. The overtopping part 70 of the contact protection 8 may form a touch protection 72, which in plugging direction S covers the distal end 10 of the contact element 6. Additionally, the contact protection 8 may also overtop or overlap the proximal end 12 of the contact element 6, so that the contact protection 8 along the contact element 6 extends beyond its ends 10, 12. Hence, sections of the contact pin 1, which do not form the contact element 6 but are subjected to external heating causes, may be actively cooled.

Optionally, the contact pin 1 may comprise at least one temperature sensor 74, and in an embodiment at least two temperature sensors 74, as shown in FIGS. 2 and 3. Each temperature sensor 74 may be held by the contact protection 8 in a position, in which the respective temperature sensor 74 is connected with an outer surface 22 of the contact element 6 facing away from the cooling channel system 24 in a heat-conducting manner. In an embodiment, the position of the respective temperature sensor 74 with respect to the plugging direction S is located at the same up to approximately the same height with at least one contact transmission point 76 and/or a further temperature sensor 74. As temperature sensors PT100-temperature sensors, PT1000-temperature sensors, linear temperature sensors, non-linear temperature sensors and/or thermoelements may be used.

The application of temperature sensors 74 enables monitoring of the prevalent temperatures, which for instance, may be utilized for a temperature control. The positioning of the temperature sensor 74 at the outer surface 22 of the contact element 6, which outer surface 22 faces away from the cooling channel system, prevents an underestimation of the actual temperature values. Furthermore, the temperature sensor 74 may in this embodiment measure the temperature as close as possible to the contact transmission points 76, which are also located at the outer surface 22 facing away from the cooling channel system 24 of the contact element 6.

In an embodiment, at least two temperature sensors 74 being arranged opposite one another with regard to the contact element 6, may be provided in the contact protection 8 and each being connected with an outer surface 22 facing away from the cooling channel system 24 of the contact element 6 in a heat conducting manner. The application of at least two temperature sensors 74 allows for a plausibility check of the temperature measurement data and delivers a redundant temperature measurement system.

Figure 5:
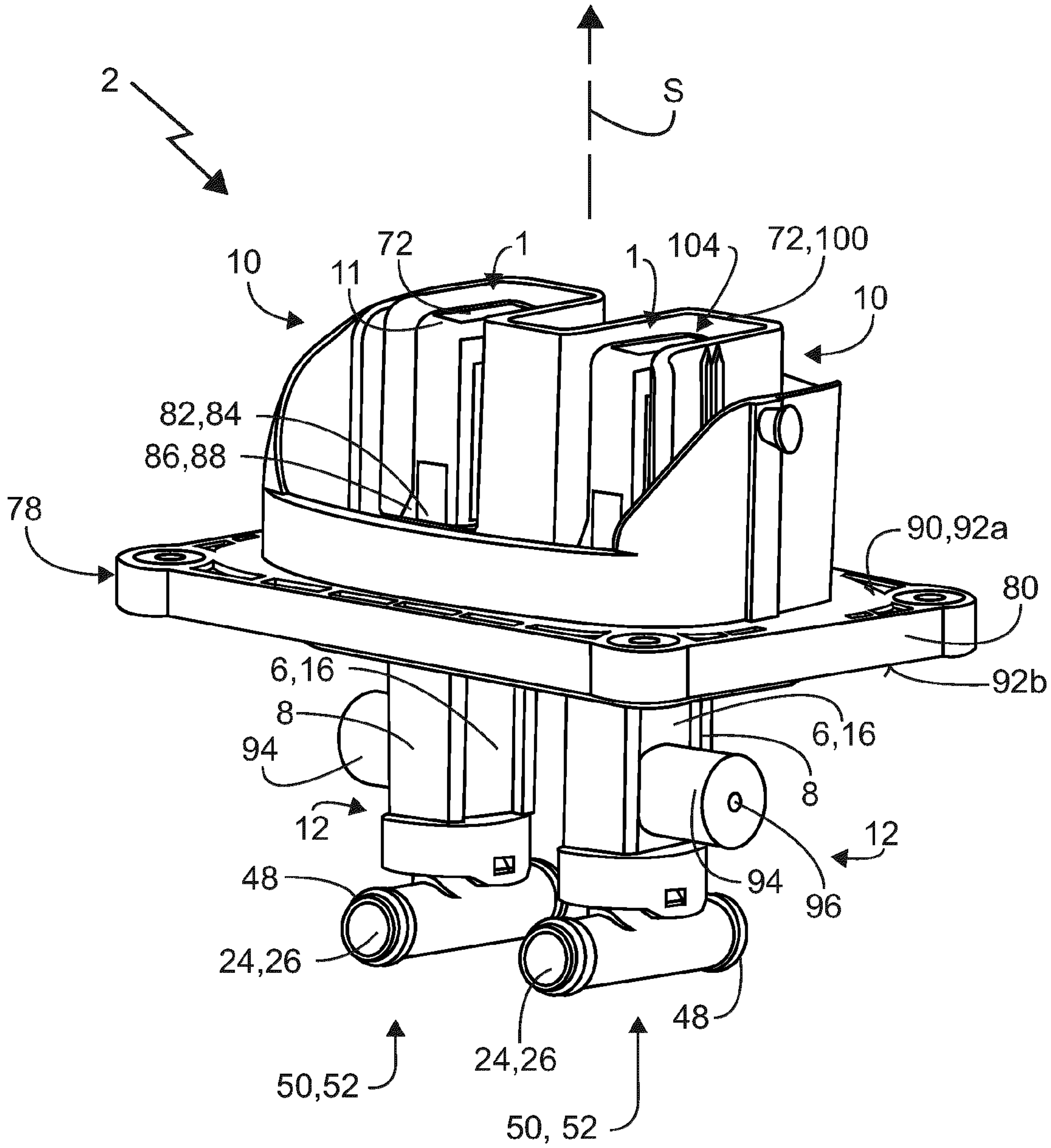
FIG. 5 is a perspective view of an electrical plug according to an embodiment.
Figure 6:
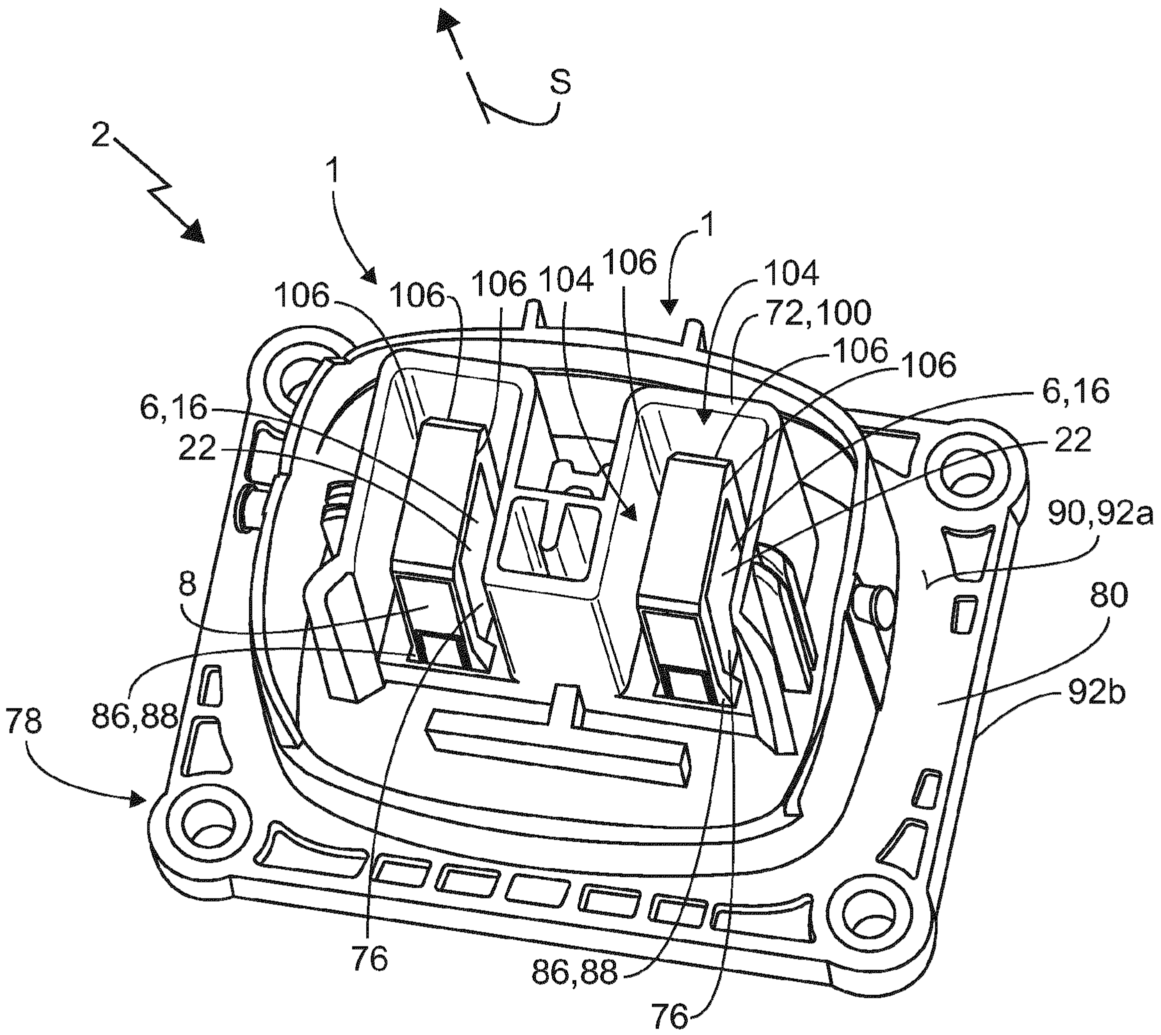
FIG. 6 is another perspective view of the electrical plug.
Figure 7:
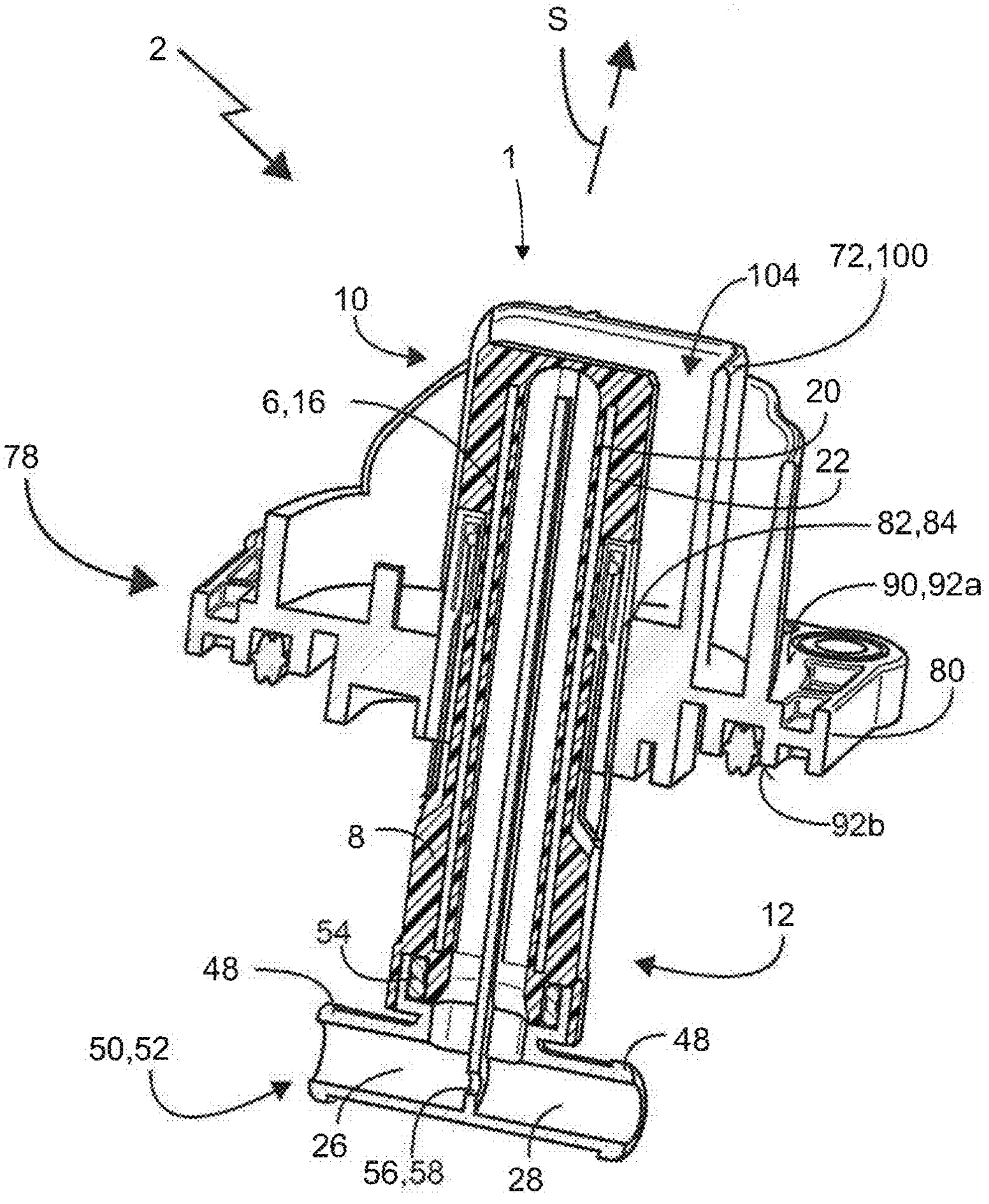
FIG. 7 is a sectional perspective view of the electrical plug.

In FIGS. 5 to 7, a possible embodiment of an inventive electrical plug 2 is depicted. The electrical plug 2 may be matable with a mating plug along a plugging direction S and comprises at least one, and in an embodiment two, inventive contact pins 1 as well as a pin strip 78. The pin strip 78 may comprise a rectangular base plate 80, which comprises a receptacle 82 for each contact pin 1. The respective receptacle 82 may be formed as a rectangular opening 84, in which the corresponding contact pin 1 is inserted and latched, pressed, or otherwise adhered. For the latching engagement, the contact protection 8 of the respective contact pin 1 may comprise at least one extension 86 in the form of a latching nose 88. The at least one extension 86 may be formed in such a manner that the side of the latching nose 88 rests on the base plate 80. Alternatively, the contact pin 1 may be pressed or adhered.

The rectangular opening 84 of the receptacle 82 runs, in an embodiment, perpendicular to the base plate 80 and in plugging direction S. Therefore, the respective contact pin 1 is oriented in the pin strip 78 along the plugging direction S and protrudes on both sides 92*a*, 92*b* from the base plate 80, as shown in FIGS. 5 to 7.

The distal end 10 of the contact element 6 of the respective contact pin 1 may be arranged on a side 90 of the base plate 80 facing the mating plug. On the opposite side of the base plate 80 facing away from the mating plug, the proximal end 12 of the contact element 6 of the respective contact pin 1 may be arranged.

At the respective proximal end 12, a screwing position 94 with a threaded bore 96 for a removable connection with a busbar is provided, as shown in FIG. 5. Alternatively, a rigid connection, for instance by welding and/or soldering, with the busbar 98 may be formed. The busbar 98 may lead to an electric aggregate, such as a relay or a battery.

Further, the T-piece 50 with corresponding ports 48 for at least one cooling fluid supply line and at least one cooling fluid return line may be located at the respective proximal end 12.

At the respective distal end 10, at least one outer surface 22 of the respective contact element 6 may enter into an electrical connection with at least one inner surface of a complementary contact element of the respective mating plug.

The pin strip 78 further comprises a finger protection wall 100, which protrudes perpendicular from the base plate 80 and surrounds the respective contact pin 1 from at least three sides, of which two are flat sides 34 formed by the contact element 6. In particular, the finger protection wall 100 may surround the distal end 10, together with the contact protection 8, in such a manner that only a slot 104 arises, in which the complementary contact element of the mating plug may be inserted, but in which a finger probe such as a VDE-joint finger probe does not fit. This means the distance between finger protection wall 100 and contact protection 8 is at every outer edge 106 of the contact protection 8 at least larger than the width of the complementary contact element of the mating plug and at least smaller than the diameter of the finger probe.

Figure 10:
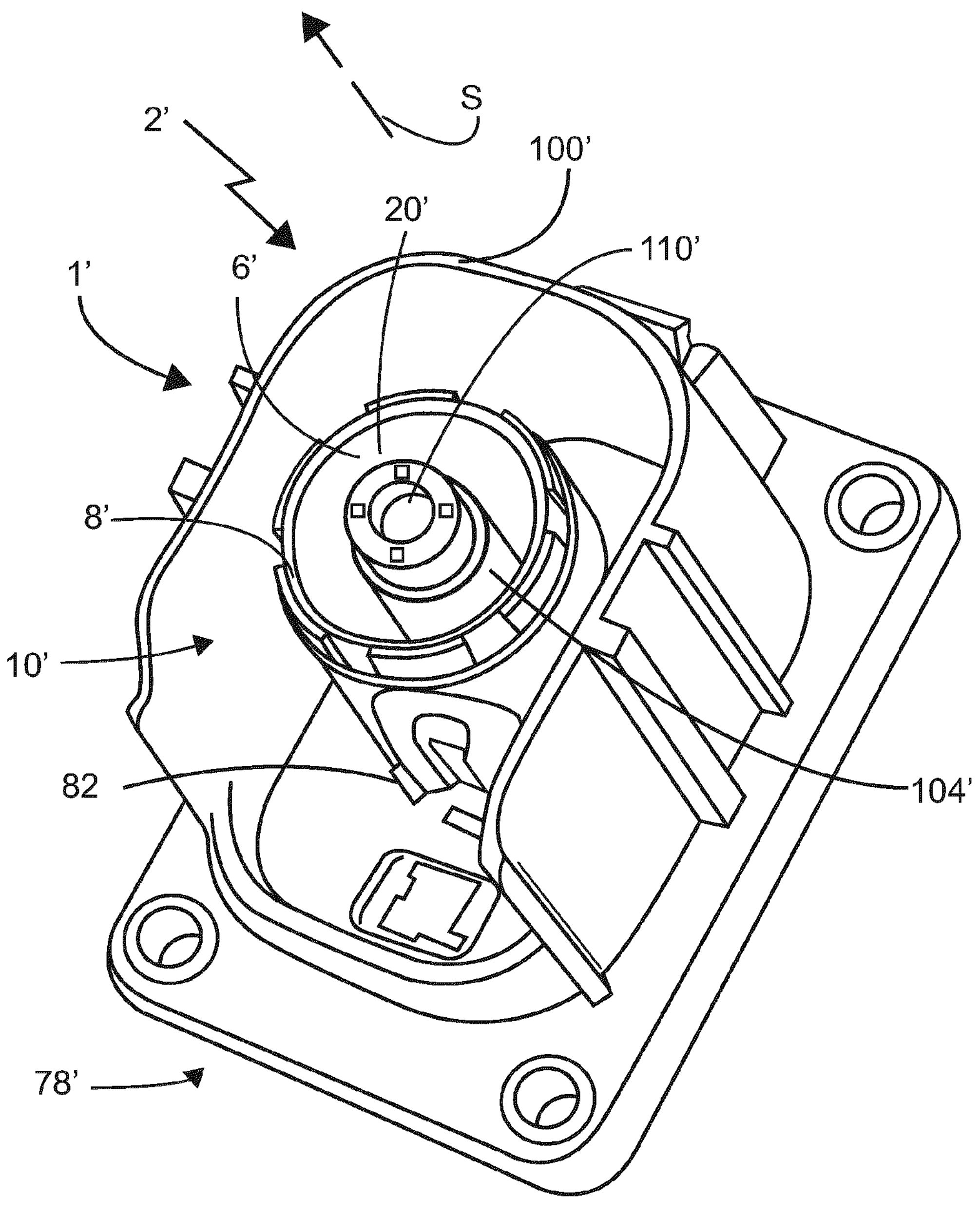
FIG. 10 is a perspective view of an electrical plug according to another embodiment.

In FIG. 10, an alternative embodiment of the inventive electrical plug 2' is depicted. In this embodiment, the electrical plug 2' comprises an inventive contact pin 1' with a round profile. Correspondingly, the contact element 6' and the contact protection 8 also comprise a round profile. At a distal end 10' of the contact element 6' facing the mating plug, at least one inner surface 20' of the contact element 6' may enter into an electrical connection with at least one outer surface of a complementary contact element of the mating plug. In this embodiment, the pin strip 78' may comprise additionally or alternatively to a finger protection wall 100' that surrounds the distal end 10' at least in sections, a finger protection stud 110'. The finger protection stud 110' is formed along the plugging direction S and protrudes through the contact pin 1'. In this instance, the finger protection stud 110' is surrounded by the contact pin 1' in such a manner that only a self-contained slot 104' arises, in which the complementary contact element of the mating contact may be inserted, but in which a finger probe, such as a VDE-joint finger probe, does not fit.

With these embodiments, an active cooling of all contact transmission points 76 may be achieved. The contact transmission points 76 are characterized in that at these points, in a completely plugged together state, the contact element 6 of the electrical plug 2 is in electrical contact with the contact element of the electrical plug with a complementary contact element of the mating plug. Generally, contact transmission points 76 are critical areas, in which it comes to a tapering of the cross section available for the electric current. The electrical heating is thus particularly high at the contact transmission points 76 in comparison to the remainder of the plug. A specific active cooling of the contact transmission points 76 according to the present invention is thus advantageous and particularly effective.

The present invention addresses the problem of generally improving the capacity and the operational reliability of an electrical plug connection. The present invention allows actively cooling the current conducting contact element 6 by the cooling fluid. The active cooling comprises an improved cooling effect in comparison to cooling by natural convection. Hence, the active cooling acts particularly strongly against both inner electrical heating and any outer heating causes. Outer heating causes may be, for example, thermal radiation of surrounding components and/or an externally heated airflow flowing past the contact element 6. The active cooling thus prevents a temperature related drop of the current carrying capacity of the electrical plug 2. Moreover, the active cooling reduces the thermal strain on the contact pin 1 and its components and on the electrical plug 2, respectively. In this way, the active cooling protects the electrical plug connection from inner and/or outer influences and thus improves both the capacity and the operational reliability of the electrical plug connection.

What is claimed is:

1. A contact pin for an electrical plug, comprising:

a contact element formed of an electrically conductive material; and a contact protection formed of an electrically non-conductive material and at least partially enclosing the contact element, a cooling channel system conducting a cooling fluid is formed in the contact protection, the cooling channel system has a cooling fluid supply and a cooling fluid return connected to the cooling fluid supply in a fluid conducting manner, the fluid cooling channel extends to a distal end of the contact element that faces a mating plug matable with the electrical plug.

2. The contact pin of claim 1, wherein the contact element at least partially forms a wall of the cooling channel system.

3. The contact pin of claim 1, wherein the contact protection holds or carries the contact element.

4. The contact pin of claim 1, wherein a pair of first opposing sides of the contact pin are formed by the contact element and a pair of second opposing sides of the contact pin are formed by the contact protection.

5. The contact pin of claim 1, wherein the contact protection has a free end extending over the distal end of the contact element.

6. The contact pin of claim 1, wherein the contact protection extends along the contact element between the distal end and a proximal end of the contact element.

7. The contact pin of claim 1, wherein at least a portion of the cooling channel system is arranged beyond the distal end of the contact element.

8. The contact pin of claim 1, wherein the contact element has a pair of opposing sections between which the cooling channel system is arranged.

9. The contact pin of claim 1, further comprising a plurality of ports for the cooling fluid supply and the cooling fluid return at a proximal end of the contact element opposite the distal end.

10. The contact pin of claim 1, wherein the cooling channel system extends over an entire length of the contact element.

11. The contact pin of claim 1, wherein the cooling channel system has a U-shaped pathway.

12. The contact pin of claim 1, wherein a partition wall extends in the cooling channel system.

13. The contact pin of claim 1, further comprising a temperature sensor connected to an outer surface of the contact element in a heat-conducting manner.

14. The contact pin of claim 13, wherein the temperature sensor is provided in the contact protection.

15. The contact pin of claim 1, wherein the contact protection forms a touch protection covering the distal end of the contact element.

16. An electrical plug, comprising:

a contact pin including a contact element formed of an electrically conductive material and a contact protection formed of an electrically non-conductive material and at least partially enclosing the contact element, a cooling channel system conducting a cooling fluid is formed in the contact protection, the cooling channel system has a cooling fluid supply and a cooling fluid return connected to the cooling fluid supply in a fluid conducting manner, the fluid cooling channel extends to a distal end of the contact element that faces a mating plug matable with the electrical plug; and a pin strip in which the contact pin is fixed, the pin strip has a finger protection wall forming a touch protection for the contact element with the contact protection.

* * * * *